United States Patent [19]

Stecklein

[11] 4,292,002
[45] Sep. 29, 1981

[54] SHAFT LEVER COUPLING MEANS

[75] Inventor: Gary L. Stecklein, Dubuque, Iowa

[73] Assignee: Deere & Company, Moline, Ill.

[21] Appl. No.: 102,381

[22] Filed: Dec. 11, 1979

[51] Int. Cl.³ .......................... B25G 3/00; F16D 1/00; F16B 9/02

[52] U.S. Cl. .................................. 403/376; 403/389; 403/399; 403/406; 248/219.3

[58] Field of Search .............. 403/388, 389, 390, 399, 403/406, 376; 101/44; 248/219.3, 539, 540; 24/257, 258; 172/753, 762, 763, 166, 311, 484

[56] References Cited

U.S. PATENT DOCUMENTS

| 1,133,709 | 3/1915 | Conley | 403/389 |
| 2,377,318 | 6/1945 | Smith | 403/389 X |
| 2,777,378 | 1/1957 | Hunter | 403/389 X |
| 3,961,854 | 6/1976 | Jaquet | 128/92 A X |
| 4,135,505 | 1/1979 | Day | 128/92 A |
| 4,194,576 | 3/1980 | Graber | 172/763 |

FOREIGN PATENT DOCUMENTS 2020980 11/1971 Fed. Rep. of Germany ...... 248/540

Primary Examiner—Wayne L. Shedd

[57] ABSTRACT

The shaft-lever coupling means is comprised of two sections. The first section has a generally V-shaped cross-section configuration to receive a shaft between the interior walls of the first section, the shaft being secured between the interior wall by a bolt passed generally transversely through the first section and shaft, a mating nut being secured to the end of the bolt. A second section extends generally perpendicular to the first section having at least one hole sized to receive a lever.

2 Claims, 2 Drawing Figures

SHAFT LEVER COUPLING MEANS

BACKGROUND OF THE INVENTION

This invention relates to lever-to-shaft coupling means.

Linkage arrangements have been used for many applications where the transmission of force and displacement are required. Then means of coupling an input shaft to linkage levers varies between a very sloppy fit between the levers and the associated shaft, which is typically the most economical to manufacture, to a solid fit between the levers and the associated shaft, which is typically the most expensive to manufacture.

This invention relates to lever-to-shaft coupling means which is both economical to manufacture and provides a solid or positive communication between a shaft and levers able to transmit force and displacement in both the rotational and axial directions.

SUMMARY OF THE INVENTION

The shaft-lever coupling means is comprised of two sections. The first section has a generally V-shaped cross-sectional configuration. The interior surfaces or shaft contact surface of the first section can receive a shaft placed lengthwise within the first section. To secure the shaft to the first section a bolt is passed generally transversely through the first section and shaft. Because of the V-shaped cross-sectional configuration a variety of radially sized shafts may be accommodated by the first section to provide a positive fit. The second section of the coupling means projects generally perpendicular from the first section having at least one hole therein to receive a portion of a lever therethrough to provide a positive fit. The coupling means can transmit force and displacement from the shaft to the lever in the rotational and axial direction.

It is an object of the present invention to present a shaft-to-lever coupling means which can accommodate varying, radially sized shafts. It is a further object of the present invention to present a coupling means to provide a positive communication between a shaft and associated levers which coupling means can be manufactured economically.

DETAILED DESCRIPTION OF THE PREFERRED EMBODIMENT

Figure 1:
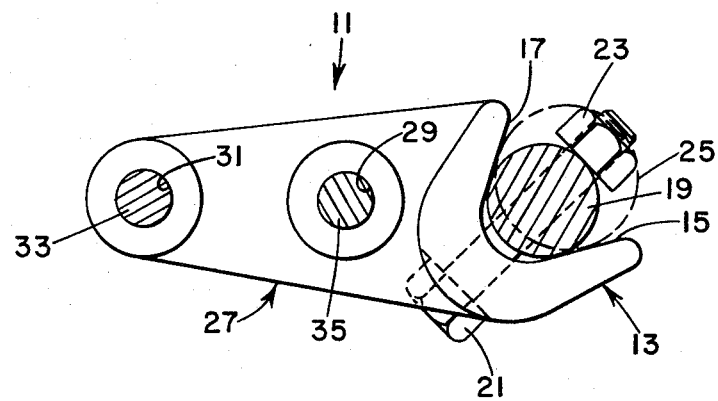
FIG. 1 is an elevated view of the attachment means.
Figure 2:
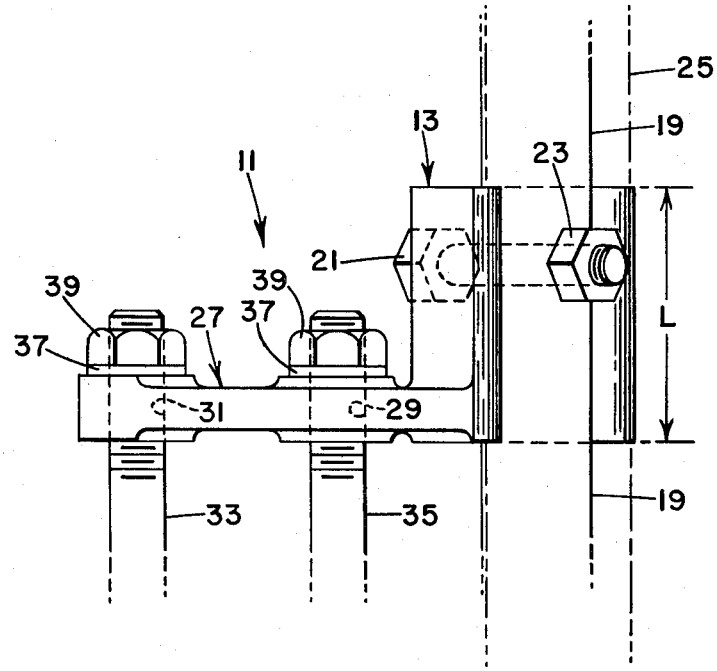
FIG. 2 is a plan view of the attachment means.

Referring to FIGS. 1 and 2, the shaft-lever coupling means, generally indicated as 11, includes a first section 13 having a generally V-shaped cross-sectional configuration of a length L. The adjacent interior surfaces 15 and 17 of the first section 13 form a shaft contact surface. A portion of a shaft 19 is placed between the interior surfaces 15 and 17 of the first section 13 and is secured therein by a bolt 21 passed generally transverse through the first section 13 and the shaft 19, having a hex nut 23 secured to the bolt 21. It is observed that the first section 13 because of the V-shaped cross-sectioned configuration can accommodate a variety of radially sized shafts 19, the maximum size shaft being indicated as 25 in phantom.

A second section, generally indicated as 27, extends generally perpendicular from the first section 13 having a plurality of holes 29 and 31 therein such that an end thread portion of first and second levers 33 and 35 may pass through the respective holes 29 and 31 being secured therein by a washer 37 and bolt 39. It is observed that rotation of a shaft 19 or 25 will rotate the first and second levers 33 and 35, respectively. Further axial displacement of the shaft 19 or 25 will axially displace the first and second levers 33 and 35, respectively.

It is understood that as many levers as desired may be attached to the second section 27 of the attachment means 11 by providing a sufficient number of holes.

I claim:

1. A shaft-lever attachment means, comprising a first section having a generally V-shaped cross-sectional configuration of length L to receive a portion of said shaft lengthwise within the interior walls of said first section; a securing means to apply a compressive load between the first section and said shaft; a second section extending generally perpendicular from said first section having at least one hole within said second section, said hole being generally parallel to the elongation of said first section, whereby at least one lever can be partially passed through said hole of said second section and secured therein such that rotation of said shaft will translate to rotation of said lever and axial displacement of said shaft can be translated to axial displacement of said lever.

2. A shaft-lever attachment means as claimed in claim 1 wherein said securing means is a bolt extending generally transverse through said first section and said second section having a mating nut screwably secured to said bolt placing said first section and said shaft in compression.

* * * * *